(12) United States Patent
Ackermann

(10) Patent No.: US 8,147,619 B2
(45) Date of Patent: Apr. 3, 2012

(54) CHEMICAL CAVITATION AND CLEANING PROCESS

(76) Inventor: Heiko Ackermann, Weilheim (DE)

( * ) Notice: Subject to any disclaimer, the term of this patent is extended or adjusted under 35 U.S.C. 154(b) by 24 days.

(21) Appl. No.: 12/776,404

(22) Filed: May 9, 2010

(65) Prior Publication Data

US 2010/0291639 A1 Nov. 18, 2010

Related U.S. Application Data

(63) Continuation-in-part of application No. 12/467,267, filed on May 16, 2009, now Pat. No. 7,998,449.

(51) Int. Cl.
*B08B 3/00* (2006.01)
*B08B 9/00* (2006.01)
(52) U.S. Cl. .................... 134/34; 134/168 R
(58) Field of Classification Search ............. 127/1–28, 127/37; 204/157.6, 157.62, 157.68; 134/21, 134/34, 168 R; 435/105; 536/120
See application file for complete search history.

(56) References Cited

U.S. PATENT DOCUMENTS

2008/0047590 A1 * 2/2008 Weill et al. .................... 134/34

OTHER PUBLICATIONS

Su, et al., Cavitation luminescence in a water hammer: Upscaling sonoluminescence, Physics of Fluids 2003; 15(6): 1457-1461.*
Ozturk, et al., Splitting Tendency of Cellulosic Fibres, Lenzinger Berichte 2005; 84: 123-129.*
Williams, et al., Pressure waves arising from the oscillation of cavitation bubbles under dynamic stressing, J. Phys. D: Appl. Phys. 1997; 30: 1197-1206.*

* cited by examiner

*Primary Examiner* — Daniel C. McCracken

(57) ABSTRACT

Cavitation is an often used mechanism for accelerating chemical reactions and for cleaning purposes. This invention describes a very simple process for generating cavitation with a vibration table through vertical excitations which generates a "water hammer" that generates very effective cavitation. A simple example is given for an industrial application of this process—splitting cellulose via sulfuric acid to glucose.

7 Claims, 2 Drawing Sheets

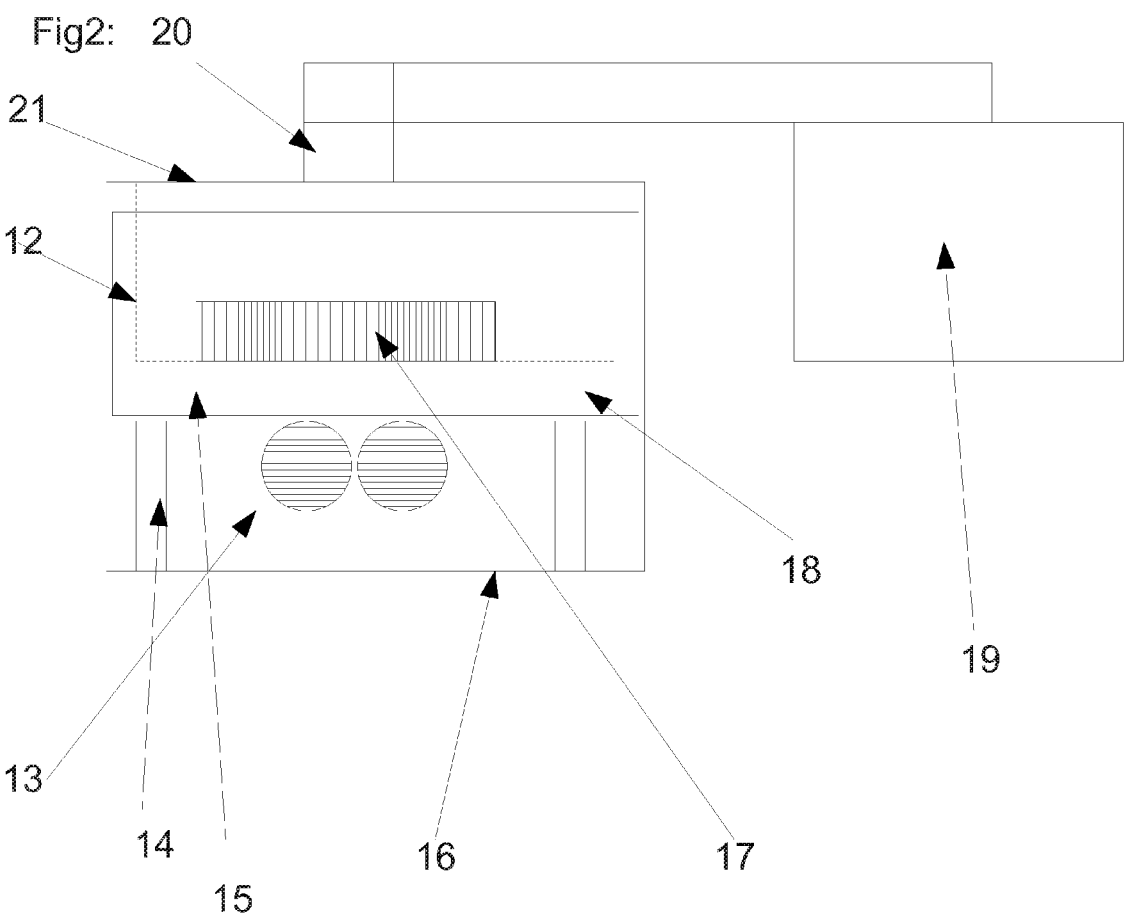

CHEMICAL CAVITATION AND CLEANING PROCESS

CROSS-REFERENCE TO RELATED APPLICATIONS

Figure 1:
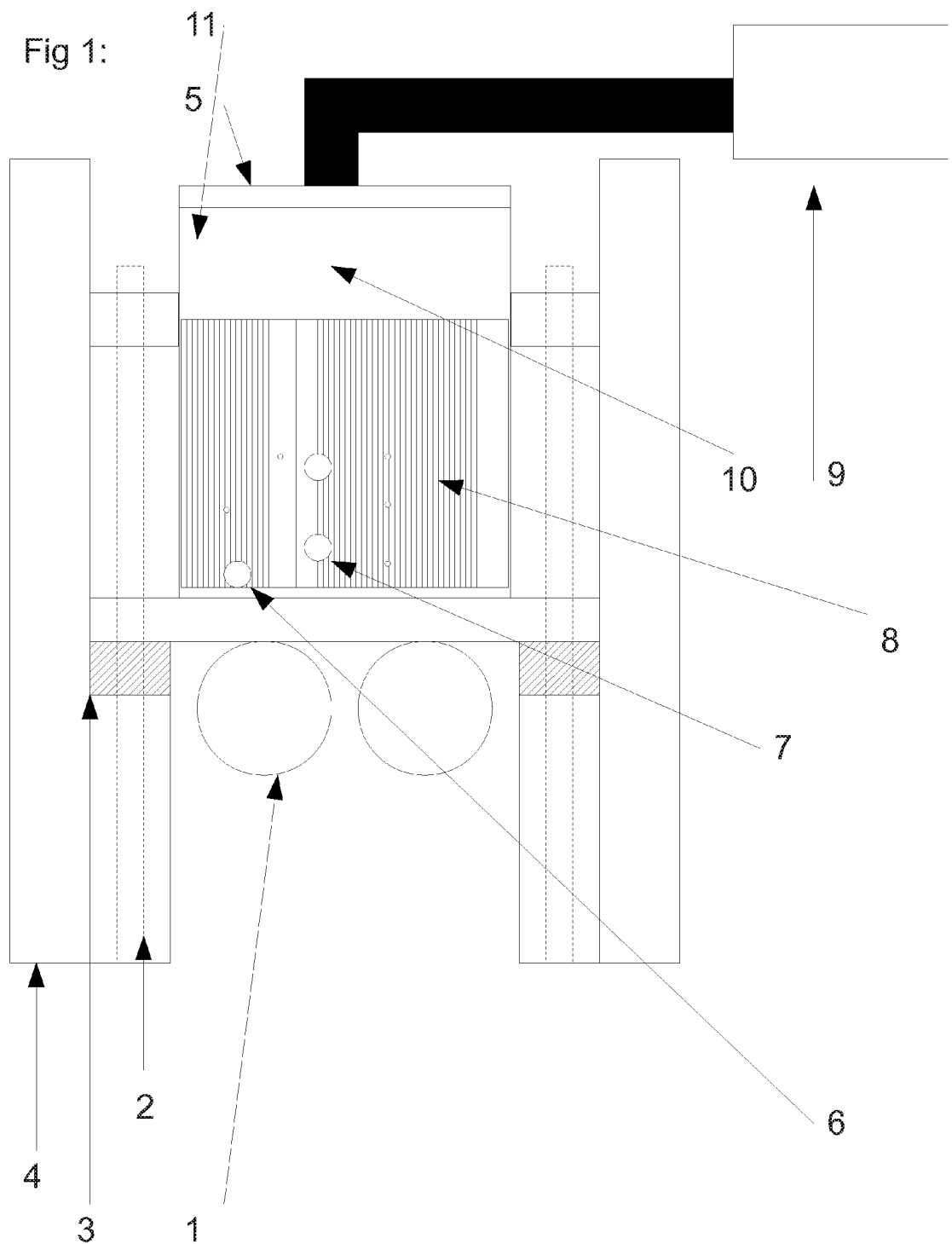

This application is a continuation-in-part of U.S. patent application Ser. No. 12/467,267 filed on May 16, 2009 (U.S. Pat. No. 7,998,449) entitled "Carbon Nanotubes Production Process."

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

The invention relates to the field of sonochemistry in general. It is a Continuation-in-part patent application of patent application Ser. No. 12/467,267 "carbon nanotubes production process"

(2) Description of Related Art Including Information Disclosed Under 37 CFR 1.97 and 1.98

In chemistry, the study of sonochemistry is concerned with understanding the effect of sonic waves and wave properties on chemical systems. The chemical effects of ultrasound do not come from a direct interaction with molecular species. Studies have shown that no direct coupling of the acoustic field with chemical species on a molecular level can account for sonochemistry or sonoluminescence. Instead, sonochemistry arises from acoustic cavitation: the formation, growth, and implosive collapse of bubbles in a liquid. This is demonstrated in phenomena such as ultrasound, sonication, sonoluminescence, and sonic cavitation.

Upon irradiation with high intensity sound or ultrasound, acoustic cavitation usually occurs. Cavitation—the formation, growth, and implosive collapse of bubbles irradiated with sound—is the impetus for sonochemistry and sonoluminescence. Bubble collapse in liquids produces enormous amounts of energy from the conversion of kinetic energy of the liquid motion into heating the contents of the bubble. The compression of the bubbles during cavitation is more rapid than thermal transport, which generates a short-lived localized hot-spot. Experimental results have shown that these bubbles have temperatures around 5000 K, pressures of roughly 1000 atm, and heating and cooling rates above $10^{10}$ K/s. These cavitations can create extreme physical and chemical conditions in otherwise cold liquids. These effects can also be generated through hydrodynamic cavitation which is done by cavitizer. The main problem is that the hydrodynamic cavitation generates very low chemical effects. This is described in "Chemical Induced by Hydrodynamic Cavitation" J. Am. Chem. Soc., 1997,119,9303-9304 by Suslick, K. S.; Mdleleni, M. M.; Ries, J. T. This invention solves that problem using a vibration table which generates vertical excitements.

BRIEF SUMMARY OF THE INVENTION

This invention describes a method for enhancing chemical reactions in a liquid. It uses a vibration table which generates vertical excitations. These excitations causes inside a vacuum container containing a liquid cavitation. This cavitation causes the disruption of the organic material and the enhancing of the chemical splitting process of the cellulose material. The resulting chemical product is mostly glucose.

DETAILED DESCRIPTION OF FIG. 1

FIG. 1 shows a vibration table with a container (11) fixed on it. The vibration table consist of two electric external vibrators (1) four guide rods (2) which are inside a housing (4). The container (11) is fixed to a plate which rests on four dampers (3). The container has a cover (5) which is connected to a vacuum pump (9). Inside of the container is a vacuum (10) and a liquid (8) with cavitation bubbles (7).

Operation of FIG. 1

The two electric vibrators (1) are running in opposite directions this cause a vertical excitement of the container (11) with the liquid in it. Then if the acceleration is strong enough the following happens inside the liquid (8). The liquid is not fast enough to follow the excitement this generates cavitation bubbles (7) inside the liquid and also a water hammer. This water hammer is generated as the liquid is accelerated upwards and then the container is accelerated faster than 9.81 m/sec$^2$ downwards this generates a vacuum gap (6). As the liquid hits the container again a strong shock wave called water hammer is generated which generates also cavitation bubbles (7). If a vacuum (10) is generated with the help of a vacuum pump (9) the efficiency of the process can greatly be improved.

The cavitation bubbles can be used to support chemical reactions. In a special case the liquid is Hydrochloric acid with organic cellulose containing material. It is well know that acids are able to split cellulose into glucose but this process is mostly done using high temperatures. This process has the same efficiency but much less energy is needed.

DETAILED DESCRIPTION OF FIG. 2

FIG. 2 shows the device for cleaning purposes. It consists of two external electric vibrators (13) fixed to a vibration container (18) containing a liquid (15) with a grid (12) which is fixed to the cover (21) of an all surrounding vacuum chasing (16). Inside the grid (12) lays the material which has to be cleaned (17). Also a vacuum pump (19) is connected through a vacuum connection (20) to the vacuum chasing (16).

Operation of FIG. 2

The operation of FIG. 2 is similar to the operation of the device in FIG. 1. The vibrators causes a vertical excitement which generates cavitation this cavitation is used for cleaning the material in the grid. This can be done with or without a generated vacuum.

BRIEF DESCRIPTION OF THE SEVERAL VIEWS OF THE DRAWING(S)

FIG. 1 shows the complete apparatus.
FIG. 2 shows the device for cleaning purposes.

| DRAWINGS - REFERENCE NUMERALS | |
|---|---|
| 1 | electric external vibrators |
| 2 | guide rod |
| 3 | vibration damper |
| 4 | housing |
| 5 | cover |
| 6 | vacuum gap |
| 7 | cavitation bubbles |
| 8 | liquid |
| 9 | vacuum pump |
| 10 | vacuum |
| 11 | container |
| 12 | grid |
| 13 | electric external vibrator |
| 14 | standings |
| 15 | liquid (water) |
| 16 | vacuum housing |
| 17 | material for cleaning |
| 18 | container |
| 19 | vacuum pump |
| 20 | vacuum connection |
| 21 | cover |

The invention claimed is:

1. A method for generating cavitation in a fluid comprising:
placing a liquid in a container;
generating a vacuum in the container with a vacuum pump in fluid communication with the container;
and subjecting the container to vertical oscillations to generate cavitation in the fluid.

2. The method of claim 1, wherein the liquid comprises sulfuric acid.

3. The method of claim 1, wherein the liquid comprises cellulose.

4. An apparatus comprising:
a container with a cover;
a vacuum pump in fluid communication with the container;
at least one vibrator connected to the container such that the vibrator is capable of generating vertical oscillations of the container.

5. The apparatus of claim 4, further comprising a vibration damper.

6. The apparatus of claim 4, further comprising a housing.

7. The apparatus of claim 4, further comprising a guide rod.

* * * * *